(12) United States Patent
Vanover

(10) Patent No.: US 11,396,382 B2
(45) Date of Patent: Jul. 26, 2022

(54) HIGH VISIBILITY SAFETY TAG

(71) Applicant: Jackie Vanover, Puyallup, WA (US)

(72) Inventor: Jackie Vanover, Puyallup, WA (US)

( * ) Notice: Subject to any disclaimer, the term of this patent is extended or adjusted under 35 U.S.C. 154(b) by 0 days.

(21) Appl. No.: 16/683,308

(22) Filed: Nov. 14, 2019

(65) Prior Publication Data

US 2021/0147098 A1 May 20, 2021

(51) Int. Cl.
*G09F 21/08* (2006.01)
*B64F 1/00* (2006.01)
*G09F 3/02* (2006.01)
*B64C 39/02* (2006.01)

(52) U.S. Cl.
CPC ............. *B64F 1/005* (2013.01); *G09F 3/02* (2013.01); *B64C 39/024* (2013.01); *G09F 2003/023* (2013.01); *G09F 2003/0276* (2013.01)

(58) Field of Classification Search
CPC .... B64F 1/005; G09F 3/02; G09F 2003/0276; G09F 2003/023; G09F 21/06; G09F 21/08; B64C 39/024
See application file for complete search history.

(56) References Cited

U.S. PATENT DOCUMENTS

| | | | | |
|---|---|---|---|---|
| 1,472,381 A | * | 10/1923 | Bangs | G09F 3/0341 292/307 R |
| 3,031,359 A | * | 4/1962 | Blank | B65D 63/1009 229/117.26 |
| D386,867 S | * | 11/1997 | Clark | |
| 5,704,649 A | * | 1/1998 | Small | B65D 55/06 283/101 |
| 5,778,581 A | * | 7/1998 | Bailey | |
| 6,276,725 B1 | * | 8/2001 | Laurash | G09F 3/0292 206/459.1 |
| 6,893,158 B1 | * | 5/2005 | Tipp | |
| 8,132,471 B2 | * | 3/2012 | DeGroff | B64F 1/005 73/861.65 |
| 8,641,106 B2 | * | 2/2014 | Probasco | B64F 1/005 244/129.1 |
| 10,242,601 B2 | * | 3/2019 | Maltas | G09F 3/0295 |
| 10,864,996 B1 | * | 12/2020 | Abdalwahid | H04N 5/2257 |

(Continued)

*Primary Examiner* — Cassandra Davis
(74) *Attorney, Agent, or Firm* — Kimberly McLean; McLean Law LLC

(57) ABSTRACT

A high visibility safety tag device including a body member and a safety tag member. The body member including a first adhesive element, an elastic element and a second adhesive element. The first adhesive element including an adhesive mechanism for attachment to an object at a first location, the elastic element including an elastic strap positioned in a vertical orientation along the body of the object with the first adhesive element and the second adhesive element positioned at opposite ends of the elastic element. The second adhesive element including an adhesive mechanism for attachment to the object at a second location which is located at an opposite end from the first location. The safety tag member is attached to the body member and includes a safety tag, and wherein the body member and the attached safety tag member are positioned vertically along the object in a manner such that a part of the device is visible from a front side of the object and a part of the device is visible from a back side of the object.

8 Claims, 4 Drawing Sheets

(56) References Cited

U.S. PATENT DOCUMENTS

| | | | |
|---|---|---|---|
| 2006/0022027 A1* | 2/2006 | Grebinski | B65D 55/06 |
| | | | 229/125.37 |
| 2011/0086194 A1* | 4/2011 | Williams | G09F 3/10 |
| | | | 428/43 |
| 2012/0125958 A1* | 5/2012 | Waltersdorf | |
| 2015/0010736 A1* | 1/2015 | Aiura | B42F 21/06 |
| | | | 428/195.1 |
| 2018/0047319 A1* | 2/2018 | Barba | G09F 13/02 |
| 2019/0027072 A1* | 1/2019 | Labowsky | G09F 21/20 |
| 2019/0350351 A1* | 11/2019 | Mody | B29C 65/48 |

* cited by examiner

HIGH VISIBILITY SAFETY TAG

FIELD OF THE INVENTION

Embodiments described herein generally relate to safety tags, and more particularly to a high visibility safety tag.

BACKGROUND OF THE INVENTION

Safety tags are a standard component of aircrafts and spacecrafts. Typically, the tags are placed on removable aircraft and spacecraft components to indicate that a removable component, such as, for example, a protective cover, is only used when the aircraft is on the ground (parked or taxiing). However, the standard safety tags are typically not visible to the individuals responsible for removing the components. Consequently, the tags are commonly left in place prior to starting the aircraft/spacecraft resulting in damage to vital components. Hence a high visibility safety tag is desirable to prevent damage to components of the aircraft/spacecraft.

BRIEF DESCRIPTION OF THE DRAWINGS

The various advantages of the embodiments of the present disclosure will become apparent to one skilled in the art by reading the following specification and appended claims, and by referencing the following drawing(s), in which:

SUMMARY OF THE INVENTION

Exemplary embodiments disclosed herein describe a high visibility safety tag device including a body member and a safety tag member. The body member including a first adhesive element, an elastic element and a second adhesive element. The first adhesive element including an adhesive mechanism for attachment to an object at a first location, the elastic element including an elastic strap positioned in a vertical orientation along the body of the object with the first adhesive element and the second adhesive element positioned at opposite ends of the elastic element. The second adhesive element including an adhesive mechanism for attachment to the object at a second location which is located at an opposite end from the first location. The safety tag member is attached to the body member and includes a safety tag. The body member and the attached safety tag member are positioned vertically along the object in a manner such that a part of the device is visible from a front side of the object and a part of the device is visible from a back side of the object.

In some exemplary embodiments, the first location is positioned on top of the object.

In some exemplary embodiments, the second location is positioned where a removable component of the object is located.

In some exemplary embodiments, the safety tag includes a reminder indication to remove the removable component from the object.

In some exemplary embodiments, the object is an unmanned aerial vehicle (UAV).

In some exemplary embodiments, the removable structure is a camera clamp.

In some exemplary embodiments, the safety tag member includes a top layer, a middle layer, and a bottom layer.

In some exemplary embodiments, the middle layer is positioned in between the top layer and the bottom layer and is visible from the top layer.

In some exemplary embodiments, the middle layer includes one or more flamboyant attributes.

In some exemplary embodiments, the one or more flamboyant attributes include at least one from the group comprising bright color, large font text, color text and bold text.

DETAILED DESCRIPTION

Figure 1:
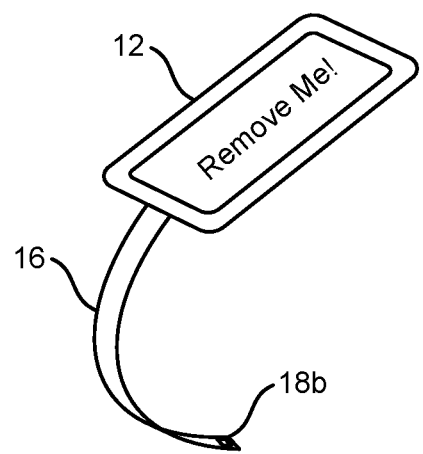
FIG. 1 shows an exemplary view of a high visibility safety tag device according to an embodiment of the present disclosure.
Figure 2:
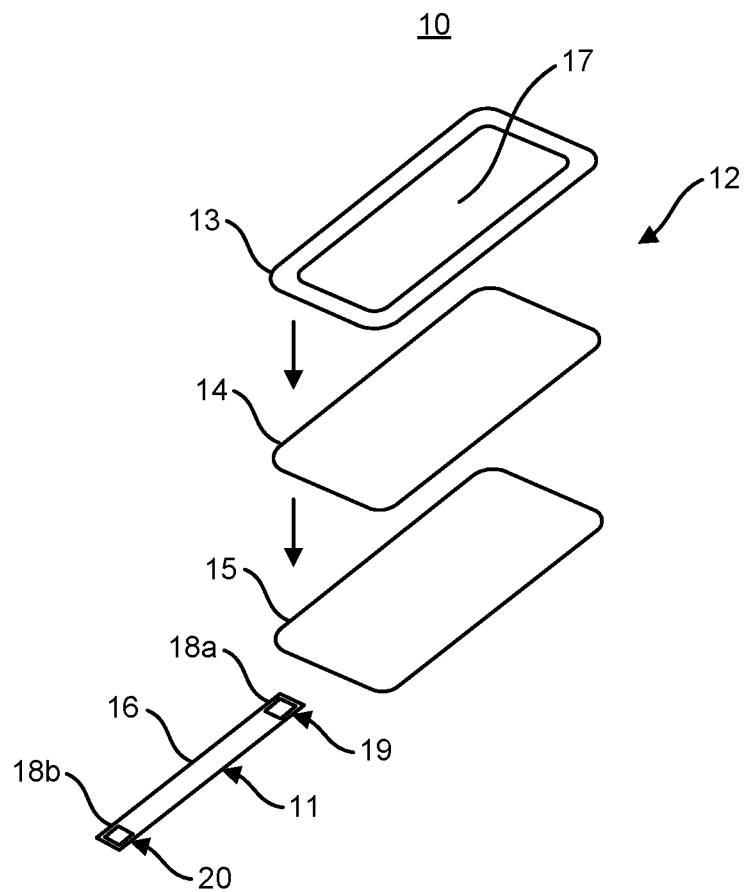
FIG. 2 shows another exemplary view of the high visibility safety tag device according to an embodiment of the present disclosure.

The present disclosure relates to a high visibility safety tag device ("the device"). As illustrated in FIGS. 1-3, the device 10 includes a body member 11 and a safety tag member 12. The body member 11 includes an elastic element 16, a first adhesive element 18a, and a second adhesive element 18b. The first and second adhesive elements each include an adhesive mechanism integrated on a back side of the elastic element 16. The safety tag member 12 may be attached to one end of the body member 11 on a front side of the elastic element 16. The safety tag member 12 may be fixedly attached to the body member 11, or alternatively, the safety tag member 12 may be removably attached to the body member. The collective safety tag member and body member (i.e., the device) are attached to an object by attaching the first and second adhesive elements to the object.

Figure 3A:
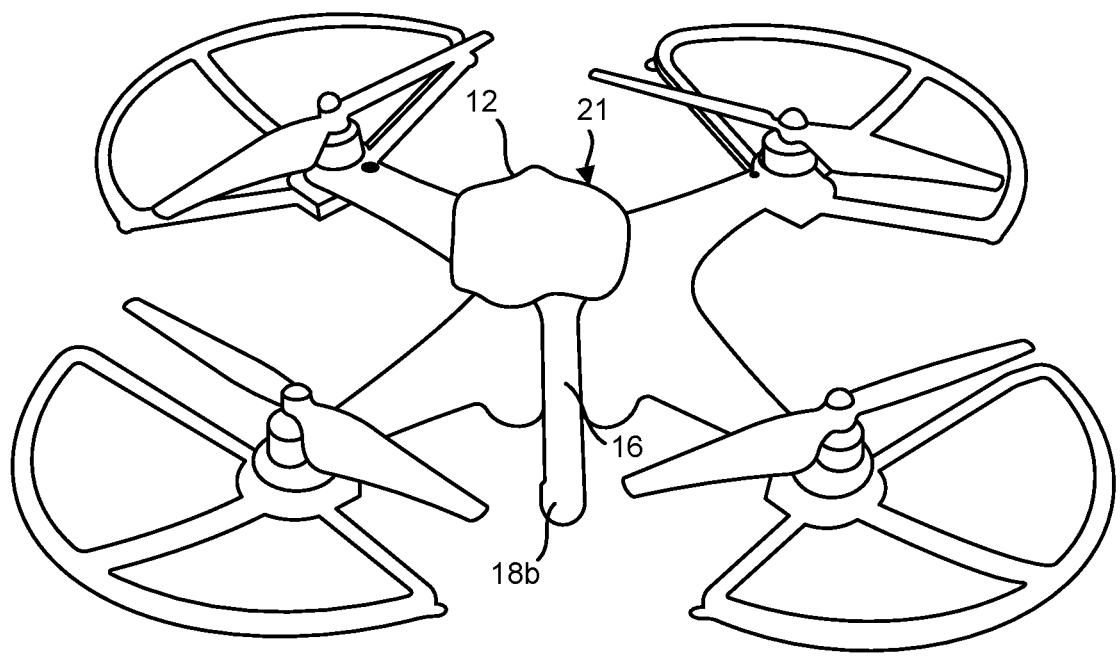
FIG. 3A shows an exemplary front view of the high visibility safety tag device attached to an aircraft.
Figure 3B:
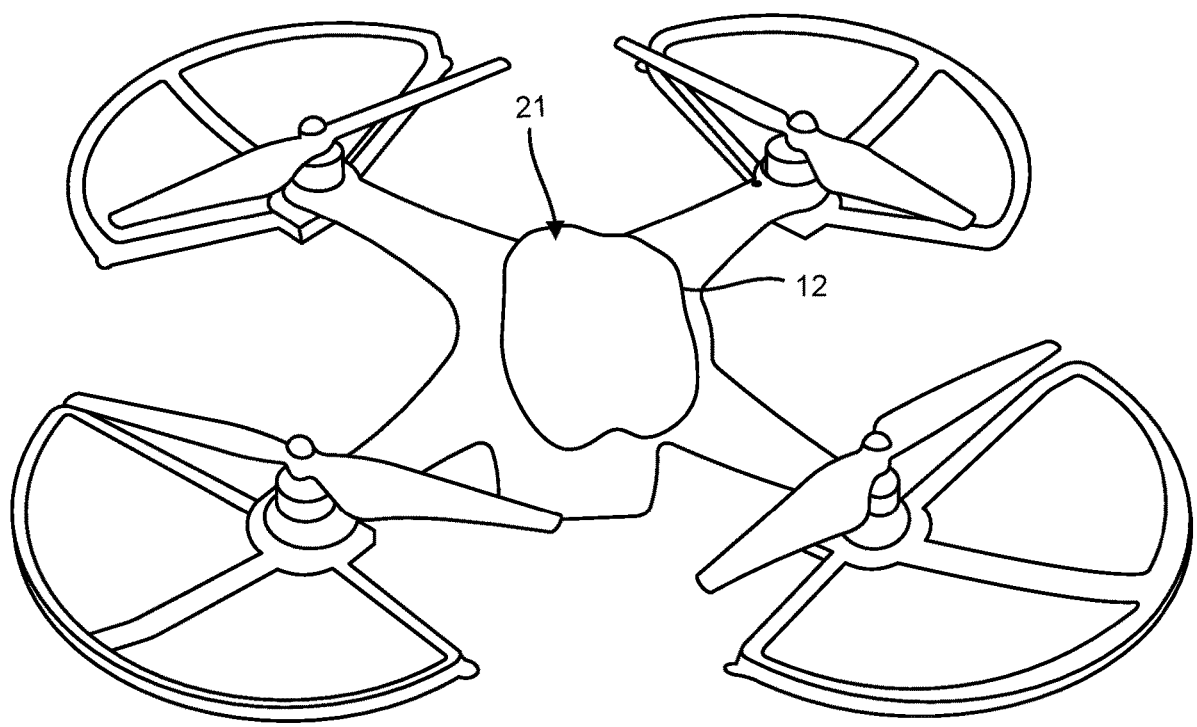
FIG. 3B shows an exemplary rear view of the high visibility safety tag device attached to an aircraft.

As noted, the device 10 is configured to be attached to an object. For example, the object may be an aircraft, such as, unmanned aerial vehicle (UAV) 21. The body member 11 may be attached to the object in a vertically oriented position. In this configuration, one of the adhesive elements of the body member may be positioned at a first location, such as, for example, a location on top of the object and the other adhesive element may be positioned at a second location, such as, for example, a location at a lower region of the object. As a result of this configuration, the device extends from the top of the object and along the front surface of the object, as shown in FIGS. 3A and 3B, which makes the device 10 readily noticeable to an individual (e.g., an operator of the aircraft) looking at the object from the backside or the frontside.

The second location may be the location of a removable component of the object, such as, for example, a UAV's camera clamp, camera cover, and camera guard. More specifically, in a preferred embodiment, the second location is the location of a removable component of the object which should be removed before powering on the object. For instance, a UAV camera clamp should be removed before powering on the UAV. If the camera clamp is not removed, the gimbal motors will try to initialize the gimbal, but ultimately fail, which may strain the gimbal motors, and over time it may decrease the gimbal's longevity. Hence, by attaching one of the adhesive elements of the body member 11 to such a component, and attaching the other adhesive element to the top of the UAV, a safety tag stating, for example, "Remove Me!" will be displayed along the body of the object, thereby providing a reminder to the operator of the UAV to remove the component (i.e., camera clamp) before powering on the UAV.

The safety tag member 12 includes a safety tag comprised of a top layer 13, a middle layer 14, and a bottom layer 15, as shown in FIG. 2. The layers are all sandwiched together to form safety tag member 12. The top layer 13 includes a cut out region 17 which accentuates any text imprinted on the middle layer 14. The middle layer 14 is visible from the top layer. The top layer may be made from any suitable durable material and may be of any color. In a preferred embodiment, the color of the top layer is in contrast to the color of the middle layer in order to draw attention to the safety tag.

The middle layer 14 includes one or more flamboyant attributes, such as, for example, any one or more of the attributes from the group comprising bright colored material, large font text, bold text, colored text. The flamboyant attributes help to draw attention to the safety tag. The middle layer 14 may include text imprinted on the material. The text may include any language such as, for example, reminders, hazards, etc. The reminder may include a reminder indication to remove a removable component from the object, and the text may include, for example, the words "Remove Me!". The middle layer may be made from any suitable thick and durable material and may be of any color. In a preferred embodiment, the color of the middle layer is attention grabbing, such as, for example, yellow or red.

The bottom layer 15 of the safety tag attaches directly to the body member 12 at one end of the elastic element 16. The bottom layer may be made from any suitable durable material, such as, for example, a heavy canvas material. The bottom layer may be of any color. In a preferred embodiment, the color of the bottom layer is in contrast to the color of the middle layer.

As noted, the first adhesive element 18a and the second adhesive element 18b each include an adhesive mechanism. The adhesive mechanism may include any suitable adhesive, such as, for example, Velcro, a clamp, etc. The first adhesive element and the second adhesive element may be integrated into the elastic element 16 at opposite ends of the elastic element (see references 19 and 20). The elastic element 16 may include an elastic strap or band which may be stretched along the object to allow the first adhesive element 18a and the second adhesive element 18b to extend along the body of the object between the first location and the second location respectively. Any suitable stretchable material may be used for the elastic element 16.

References throughout the disclosure to FIG. 3 is inclusive of FIG. 3A and FIG. 3B. While embodiments of the disclosure have been described relating to an unmanned aerial vehicle (UAV), other suitable aircraft objects and otherwise may be used with the device.

Moreover, it should be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.)

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

Those skilled in the art will appreciate from the foregoing description that the broad techniques of the embodiments of the present invention may be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A high visibility safety tag comprising:
   an unmanned aerial vehicle (UAV) object;
   a body member including a first adhesive element, an elastic element and a second adhesive element, the first adhesive element including an adhesive mechanism which is configured for attachment to the UAV object at a first location of the UAV object, the second adhesive element including an adhesive mechanism which is configured for attachment to the UAV object at a second location of the UAV object which is in an opposite direction from the first location, the first and second adhesive elements each include their respective adhesive mechanisms integrated on a back side of the elastic element at opposite ends of the elastic element, the elastic element including an elastic strap which is configured to stretch along a body of the UAV object in a vertical direction thereby allowing the first adhesive element to attach to the first location and the second adhesive element to attach to the second location, and
   a safety tag member which is attached to a front side of the body member at one end of the body member, and includes a safety tag, and wherein the body member and the attached safety tag member are positioned vertically along the UAV object such that the elastic strap extends from a top region of the UAV object to a bottom region of the UAV object;
   wherein the one end of the body member is a same end of the body member where the body member attaches to the second location;
   wherein the second location is positioned where a removable component of the UAV object is located.

2. The device of claim 1, wherein the first location is positioned on top of the UAV object.

3. The device of claim 1, wherein the safety tag member includes a reminder indication to remove the removable component from the object.

4. The device of claim 1, wherein the removable structure is a camera clamp.

5. The device of claim 1, wherein the safety tag member includes a top layer, a middle layer, and a bottom layer.

6. The device of claim 5, wherein the middle layer is positioned in between the top layer and the bottom layer and is visible from the top layer.

7. The device of claim 6, wherein the middle layer includes one or more flamboyant attributes.

8. The device of claim 7, wherein the one or more flamboyant attributes is selected from the group consisting bright color, large font text, colored text and bold text.

* * * * *